United States Patent
Klausner

[15] 3,666,668
[45] May 30, 1972

[54] CLEANSER, DISINFECTANT, COMBINATIONS THEREOF AND AEROSOL SYSTEMS CONTAINING SAME

[72] Inventor: Kenneth Klausner, Havertown, Pa.
[73] Assignee: The Drackett Company, Cincinnati, Ohio
[22] Filed: Nov. 21, 1967
[21] Appl. No.: 684,630

[52] U.S. Cl..............................252/90, 252/106, 252/153, 424/196, 424/322, 424/329
[51] Int. Cl.........................................C11d 3/48, C11d 1/18
[58] Field of Search..................252/106, 107, 152, 153, 305, 252/90, 352; 424/196, 329, 322, 45

[56] References Cited

UNITED STATES PATENTS

| | | | |
|---|---|---|---|
| 3,001,947 | 9/1961 | Stahler et al............................ | 252/152 |
| 2,719,129 | 12/1955 | Richardson............................ | 252/305 |
| 3,244,585 | 5/1966 | Stecker............................... | 252/106 X |
| 3,342,740 | 9/1967 | Kazmierczak et al.................. | 252/153 |

FOREIGN PATENTS OR APPLICATIONS

| | | | |
|---|---|---|---|
| 618,075 | 2/1949 | Great Britain.......................... | 252/153 |
| 672,821 | 10/1963 | Canada.................................. | 252/153 |

OTHER PUBLICATIONS

Bennett; " The Chem. Formulary," Vol. IX, 1951, pp. 119, 514–17, 519, 530.
Bennett, " The Chem. Form." Vol. XIII, 1967, p. 383.
Bennett, " The Chem. Formulary," Vol. XII, 1965, p. 274.

*Primary Examiner*—Leon D. Rosdol
*Assistant Examiner*—P. E. Willis
*Attorney*—Moss, III, William F., David J. Mugford, Irving Holtzman, George A. Mentis, Ralph D. Gelling and Marvin B. Rosenberg

[57] ABSTRACT

A compatible cleansing composition comprising pine oil, ammonium hydroxide and an ethoxylated alcohol. A disinfectant formulation particularly adapted for aerosol applications comprising a halogenated salicylanilide and a quaternary morpholinium alkyl sulfate. Disinfectant-cleanser compositions comprising said aforementioned cleanser and disinfectant in combination. Pressurized aerosol containers containing all of the foregoing.

12 Claims, No Drawings

CLEANSER, DISINFECTANT, COMBINATIONS THEREOF AND AEROSOL SYSTEMS CONTAINING SAME

BACKGROUND OF THE INVENTION

In the area of general housecleaning, aerosol surface sprays containing detergents and cleansers which are adapted to be sprayed onto a surface and then wiped off are well known in the art. More recently, unique cleansers have been formulated by incorporating an effective germicidal composition into an equally effective aerosol cleanser formulation. By means of such a product, one is able to spray a single formulation onto a surface and to simultaneously wipe the surface clean of dirt, soil and grime while ridding the area of germs, thus cleaning and disinfecting in a single operation.

Two particularly well known cleansing compounds are pine oil and ammonia, the pine oil also serving to some extent as a deodorant. While the characteristics of these two materials would normally make it particularly desirable to utilize them in a single formulation, however, these materials are normally incompatible with one another rendering their combination generally impracticable.

In addition to the difficulties in formulating an acceptable cleansing compound such as the ammoniated pine oil referred to above, further difficulties are presented in attempting to combine appropriate disinfectants with the cleansing compound to produce an acceptable cleanser-disinfectant composite. This is so although a wide variety of germicides are known (e.g., phenolics, iodine complexes, organic-metallic compounds, quaternary ammonium compounds, etc.) since preparations containing them often do not possess all of the features deemed desirable, particularly for use in aerosol cleanser-disinfectant formulations.

The properties of an aerosol cleanser-disinfectant which are considered of utmost importance are:

1. The compatibility of the disinfectant with the cleaning agents and detergents without hindering the cleaning potential or the ability to maintain optimum disinfectant activity.
2. The stability and long-term shelf-life in the aerosol system; most significantly the product should not corrode the metal aerosol container.
3. The cleanser-disinfectant should not be toxic and/or irritating to mucous membranes and the skin.
4. The disinfectant ingredients should exhibit a broad spectrum of activity against both Gram positive and Gram negative bacteria.
5. The treated surface should maintain disinfectant activity in presence of organic soil.
6. The treated surface should maintain its anti-bacterial protection for prolonged periods of time.

In the investigation which led to the present invention, it was found that various known germicides (such as quaternary ammonium compounds), while quite effective as disinfectants, hindered the cleaning activity of the finished product, caused corrosion in the aerosol can, were irritating to the mucous membrane and had a tendency to lose disinfectant activity in the presence of organic soil.

Other well-known formulations, such as a combination of Diaphene (a synergistic mixture of 3, 5, 4 -tribromosalicylanilide and 5,4'-dibromosalicylanilide) and Fluorophene (3,5-dibromo-3'-trifluoromethylsalicylanilide) were found to produce excellent results in a non-aerosol system. More specifically, the cleanser-disinfectant formulation containing the Diaphene-Fluorophene mixture was effective against Staph and other pathogenic organisms, had a wide margin of safety under actual use conditions and the disinfectant combination actually enhanced the detergency of the formula. However, when incorporated into an aerosol system, the formula produced can corrosion and was found to be ineffective against Gram positive bacteria (e.g., Staph).

In accordance with the present invention, it has now been determined that:

1. an extremely effective cleansing compound including pine oil and ammonia can be formulated by means of an ethoxylated alcohol which serves as a coupling agent for the pine oil and the ammonia to render them compatible and, at the same time, actually enhances the overall cleaning potential of the formula by virtue of its own detergency;
2. an extremely effective disinfectant formulation which is particularly adapted for aerosol use can be formulated by means of a composition containing a halogenated salicylanilide and a cationic surfactant in the form of a quaternary morpholinium alkyl sulfate, such cationic surfactant not only increasing the bactericidal effectiveness of the formulation but acting as an effective corrosion inhibitor in the total aerosol system; and
3. a particularly effective cleanser-disinfectant composite formulation which is especially well adapted for aerosol use may be formulated for the combination of one and two above.

It accordingly is a major object of the present invention to provide novel disinfectant compositions, novel cleansing compositions, novel cleanser-disinfectant composite compositions and aerosol systems containing them.

It is another important object of the present invention to provide a novel ammoniated pine oil cleanser containing a unique coupling agent in the form of an ethoxylated alcohol.

It is another important object of the present invention to provide a novel disinfectant composition containing a halogenated salicylanilide and a quaternary morpholinium alkyl sulfate.

It is still a further important object of the present invention to provide a composite cleanser-disinfectant system particularly adapted for aerosol use including an ammoniated pine oil formulation containing an ethoxylated alcohol coupling agent, a halogenated salicylanilide and a quaternary morpholinium alkyl sulfate.

These and further objects and advantages of the present invention will become more apparent through reference to the ensuing specification and claims.

In its most significant respect, the present invention involves a composite cleanser-disinfectant composition comprising five essential ingredients: (1) pine oil; (2) ammonia; (3) an ethoxylated alcohol; (4) a halogenated salicylanilide; and (5) a quaternary morpholinium alkyl sulfate.

As previously noted, the pine oil and ammonia together comprise the cleanser portion of the composite. In accordance with the present invention, these two materials, which are ordinarily incompatible with one another, are rendered compatible (viz, they form an ammoniated pine oil solution) through the use of a specific ethoxylated alcohol selected from compounds having a hydroxyl number of about 105–140 (and preferably about 120) and the following general formulas:

$$R-O(CH_2CH_2O)_nCH_2CH_2OH$$
$$R'C_6H_4(CH_2CH_2O)_xOH$$

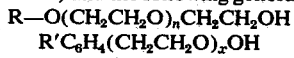

In the above formulas, R is an alkyl radical having nine to 17 carbon atoms; $n$ is 5–9; R' is an alkyl radical having eight to nine carbon atoms; and $x$ is 7–9.

As noted, the ethoxylated alcohol should have a hydroxyl number (representing the number of free hydroxyl groups) of about 105–140. The hydroxyl number (or value as it is sometimes called) is an indication of the percent free alcohol present and/or formation of hydroxyesters which aids in solubilization. The smaller the hydroxyl number the greater the hydrophobic nature of the compound; the larger the hydroxyl number the greater the hydrophilic nature of the compound.

The ethoxylated alcohol is significant in the present formulation not only because it acts as an effective coupling agent so that both pine oil and ammonia can be incorporated together but, equally importantly, it simultaneously enhances the overall cleaning potential of the formulation by virtue of its own detergency.

The number of moles of ethylene oxide in the ethoxylated alcohol used in the formulations of the present invention is significant. In the use of an alcohol formulation having the general formula set forth above but with too few moles of ethylene oxide, a separation of the more aqueous portion of the formulation (viz., ammonium hydroxide) took place; with too many moles of ethylene oxide, a separation of the pine oil took place. Thus, the particular choice of coupling agent is an extremely important aspect of the present invention.

Particularly effective results are obtained using the ethoxylated alcohol of the formula R—O—$(CH_2CH_2O)_n CH_2CH_2OH$ where R is tridecyl and $n=6$. Examples of other usable ethoxylated alcohols within this formula are those where R is nonyl and $n=6$; R is lauryl and $n=7$; R is myristyl and $n=8$; R is oleyl and $n=5$; etc.

Examples of usable ethoxylated alcohols of the formula $R'C_6H_4(CH_2CH_2O)_x OH$ are those where R' is nonyl and $n=9$; R is octyl and $n=7$; etc.

The disinfectant portion of the foregoing composition includes the halogenated salicylanilide and the quaternary morpholinium alkyl sulfate.

The halogenated salicylanilides usable in the composition of the present invention are well known germicides manufactured by Stecker Chemicals, Inc. and described more specifically in U.S. Pat. Nos. 2,906,711, 3,041,236 and 3,244,585 (the disclosures of which are hereby incorporated herein by reference). The salicylanilides involved are directly halogenated (viz., their halogen atoms are directly attached to the aromatic nuclei) and include 3,5,4'-trihalosalicylanilides, 5,4'-dihalosalicylanilides and certain trifluoromethyl salicylanilides. The 3,5,4'-trihalosalicylanilides and the 5,4'-dihalosalicylanilides have the following general formula:

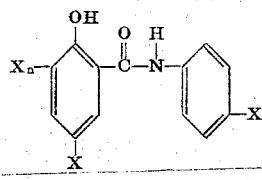

In the above formula X is chlorine, bromine or iodine and $n$ is 0–1. As will be apparent, when $n$ is 0, the above formula represents the 5,4'-dihalosalicylanilide; when n is 1, the 3,5,4'-trihalosalicylanilides are represented.

Examples of the trihalosalicylanilides are 3,5,4'-tribromosalicylanilide; 3,5,4'-triiodosalicylanilide; 3,5,4'-trichlorosalicylanilide; 3,5-dibromo-4'-chlorosalicylanilide; and the like. Examples of the dihalosalicylanilides usable in synergistic admixture with the trihalosalicylanilides are 5,4'-dichlorosalicylanilide; 5-chloro-4'-bromosalicylanilide; 5-bromo-4'-chlorosalicylanilide; 5-iodo-4'-bromosalicylanilide; and the like.

While the 3,5,4'-trihalosalicylanilides and the 5,4'-dihalosalicylanilides may be used individually as part of the novel formulations of the present invention, they may be employed in admixture with one another. A particularly effective germicide (which is marketed by Stecker Chemicals, Inc. under the name Diaphene) comprises a synergistic mixture of 3,5,4'-tribromosalicylanilide and 5,4'-dibromosalicylanilide. See U.S. Pat. No. 2,906,711 for a complete description of this synergistic mixture.

The trifluoromethyl halogenated salicylanilides usable in the formulation of the present invention have the following general formula:

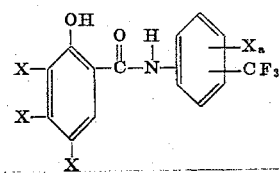

In the foregoing formula, X is chlorine, bromine, iodine or hydrogen and $a$ is 0–2. In this formula, there must be at least one and not more than three directly attached halogen atoms, none of which is adjacent to any of the others or to the $CF_3$ group. These materials are described more completely in U.S.

Pat. Nos. 3,041,236 and 3,244,585. Examples of these trifluoromethyl salicylanilides are 3,5-dibromo-3'-trifluoromethylsalicylanilide; 5-chloro-3'-trifluoromethylsalicylanilide; 5-iodo-3'-trifluoromethylsalicylanilide; 3,5-dichloro-3'-trifluoromethylsalicylanilide; 5-chloro-3'-trifluoromethylchlorosalicylanilide; and the like. A particularly effective trifluoromethyl compound of the type in question is 3,5-dibromo-3'-trifluoromethylsalicylanilide, which is sold by Stecker Chemicals, Inc. under the name Fluorophene and which when used in combination with the previously identified Diaphene produces particularly excellent stabilizing results (see U.S. Pat. No. 3,244,585).

Though the above-identified trifluoromethylsalicylanilides may be used independently of the other salicylanilides mentioned; for best results, the trifluoromethylsalicylanilide is added to the 3,5,4'-trihalosalicylanilide alone or in admixture with the 5,4'-dihalosalicylanilide in an amount from about 5 percent to 45 percent by weight of the total salicylanilide mixture.

As previously noted, while halogenated salicylanilides such as described above have been found to produce excellent results in a non-aerosol system, when incorporated into an aerosol system can corrosion took place and the formulation employed (viz., a combination of Diaphene and Fluorophene) was found to be ineffective against Gram positive bacteria (e.g., Staph).

It has now been found in accordance with the present invention that in an aerosol system, the bactericidal activity is not solely a property of chemical composition but is greatly affected by such physical factors as solubility, miscibility, ionization, surface tension and other less well-defined properties. On the basis of this recognition, it has been further found that the deficiencies resulting from the use of the halogenated salicylanilides as described above may be eliminated through the addition of a particular type of quaternary morpholinium alkyl sulfate cationic surfactant, namely N-alkyl-N-ethyl morpholinium ethosulfate in which the alkyl moiety contains about 14–18 carbon atoms with at least about 70 percent by weight of such alkyl moiety being composed of $C_{16}$—$C_{18}$ alkyl groups. Especially effective results are obtained from the use of N-soya-N-ethyl morpholinium ethosulfate or N-cetyl-N-ethyl morpholinium ethosulfate. This quarternary morpholinium compound contributes two essential results: (1) It increases the bactericidal effectiveness of the aerosol cleanser-disinfectant formulation even though the quaternary morpholinium compound itself has little bactericidal activity and has, in the past, been used chiefly as an aerosol deodorant (see U.S. Pat. No. 2,717,129); (2) It acts as an effective corrosion inhibitor in the total aerosol system.

The use of a formulation containing the five essential ingredients set forth above provides all the important requirements for an aerosol cleanser-disinfectant system previously enumerated. Furthermore, the employment of this formulation in an appropriate pressurized container also containing a conventional propellant provides an extremely effective aerosol cleanser-disinfectant formulation.

Because the cleanser-disinfectant formulation of the present invention is adapted to be sprayed onto a surface and not into the atmosphere (such as would be the case in connection with a room deodorant), it is not essential that the propellant used be such as will result in a fine spray or mist. Accordingly, the exact nature of the propellant is not a critical aspect of the present invention and any propellant which will be effective in forcing the formulation out of the pressurized container when its valve is released will be acceptable. Thus, it is contemplated within the limits of the present invention to use a wide variety of propellants, including both liquefied and compressed gas propellants such, for example, as isobutane, propane, Freons, carbon dioxide, nitrous oxide, etc.

While not a critical feature of the present invention, best results are achieved when the essential ingredients of the formulation of the present invention are used in the following approximate proportions by weight:

| | |
|---|---|
| Pine oil | 0.1–2% |
| Ammonia | 0.05–1% |
| Ethoxylated alcohol | 0.5–5% |
| Halogenated salicylanilide | 0.02–0.25% |
| Quaternary morpholinium alkyl sulfate | 0.008–0.10% |

The propellant may appropriately be present in a quantity of about 1.5–20% by weight of the total formulation.

In EXAMPLE 1, a typical formulation of the cleanser-disinfectant composition of the present invention is described.

EXAMPLE 1

| Active Ingredients | Wt. % |
|---|---|
| 3, 4', 5-Tribromosalicylanilide | –0.060 |
| 4', 5-Dibromosalicylanilide | –0.015 |
| 3, 5-Dibromo-3'-trifluoromethylsalicylanilide | –0.008 |
| N-Alkyl (C18 74%; C16 25%; C14 1%, all by weight)-N-Ethyl Morpholinium Ethylsulfates | –0.035 |
| Pine oil | –0.500 |
| Isopropyl Alcohol, 99% by weight | –5.000 |
| Inert Ingredients | Wt. % |
| Butyl Cellosolve | –5.000 |
| Ethoxylated Tridecyl Alcohol | –3.000 |
| Bis (2-Hydroxyethyl) Cocoamine Oxide | –0.500 |
| Ammonium Hydroxide (28% solution by weight) | –1.000 |
| Perfume | –0.100 |
| Water | –79.782 |
| A–46 Propellant Gas (A mixture of about 87% isobutane and 13% propane, by volume, manufactured by Phillips) | –5.000 |

In the above formulations, the functions of the salicylanilides, the pine oil, the ethoxylated alcohols, ammonium hydroxide and propellant gas have been previously described. The remaining ingredients of this formulation do not form part of the inventive concept to which this case is directed but have been included since they would constitute part of a practical formulation. Thus, the isopropyl alcohol and the Butyl Cellosolve both enhance the cleaning properties of the formulation since they have certain solvent effects on species of dirt which may not be affected by the other ingredients and also serve as diluents. The cocoamine oxide contributes to the foaming and cleaning characteristics of the product. The water serves as a diluent and, of course, the perfume is provided to contribute a pleasant scent to the formulation.

EXAMPLE 2

| Active Ingredients | Wt. % |
|---|---|
| 3, 4', 5-Tribromosalicylanilide | –0.060 |
| 4', 5-Dibromosalicylanilide | –0.015 |
| 3, 5-Dibromo-3'-trifluoromethylsalicylanilide | –0.008 |
| Pine oil | –0.500 |
| Isopropyl Alcohol 99% by weight | –5.000 |
| N-Alkyl (C18 2%; C16 75%; C14 23%, all by weight)-N-Ethyl Morpholinium Ethylsulfates | –0.035 |
| Inert Ingredients | Wt. % |
| Butyl Cellosolve | –5.000 |
| Ethoxylated Tridecyl Alcohol | –3.000 |
| Ammonium Hydroxide (28% solution by weight) | –1.000 |
| Perfume | –0.100 |
| Water | –75.282 |
| Dichlorodifluoromethane (Freon 12) | –10.000 |

EXAMPLE 3

| Active Ingredients | Wt. % |
|---|---|
| 3, 4', 5-Tribromosalicylanilide | –0.250 |
| Pine oil | –1.000 |
| N-Alkyl (C 18 74%; C16 25%; C14 1%, all by weight)-N-Ethyl Morpholinium Ethylsulfates | –0.100 |
| Isopropyl Alcohol, 99% by weight | –10.000 |
| Inert Ingredients | |
| Ethoxylated Myristyl Alcohol | –5.000 |
| Ammonium Hydroxide (28% solution by weight) | –2.000 |
| Perfume | –0.050 |
| Water | –80.100 |
| Nitrous Oxide | –1.500 |

EXAMPLE 4

| Active Ingredients | Wt. % |
|---|---|
| 3, 4', 5-Tribromosalicylanilide | –0.200 |
| 4'5-Dibromosalicylanilide | –0.050 |
| Pine oil | –2.000 |
| N-Alkyl (C 18 2%; C16 75%; C14 23%, all by weight)-N-Ethyl Morpholinium Ethylsulfates | –0.100 |
| Isopropyl Alcohol, 99% by weight | –10.000 |
| Inert Ingredients | |
| Ethoxylated Nonyl alcohol | –5.000 |
| Ammonium Hydroxide (28% solution by weight) | –0.500 |
| Perfume | –0.050 |
| Water | –77.100 |
| Isobutane | –5.000 |

In order to compare the formulations of this application with other formulations which were not prepared in accordance with the inventive concepts of the present case, two additional formulations, that of EXAMPLES 5 and 6, were prepared. That of EXAMPLE 5 is similar to that of EXAMPLE 1 except that it is lacking the quaternary morpholinium alkyl sulphate ingredient. That of EXAMPLE 6 is also deficient in the quaternary morpholinium alkyl sulphate and also contains quaternary ammonium compounds rather than the halogenated salicylanilides of EXAMPLE 1.

EXAMPLE 5

| Active Ingredients | Wt. % |
|---|---|
| 3, 4', 5-Tribromosalicylanilide | –0.060 |
| 4', 5-Dibromosalicylanilide | –0.015 |
| 3, 5-Dibromo-3'-trifluoromethylsalicylanilide | –0.008 |
| Pine oil | –0.500 |
| Isopropyl Alcohol, 99% by weight | –5.000 |
| Inert Ingredients | |
| Butyl Cellosolve | –5.000 |
| Ethoxylated Tridecyl Alcohol | –3.000 |
| Bis (2-Hydroxyethyl) Cocoamine Oxide | –0.500 |
| Ammonium Hydroxide (28% solution by weight) | –1.000 |
| Perfume | –0.100 |
| Water | –79.817 |
| A–46 Propellant Gas (Phillips) | –5.000 |

EXAMPLE 6

| Active Ingredients | Wt. % |
|---|---|
| N-Alkyl ($C_{14}$60%; $C_{16}$30%; $C_{12}$5%; $C_{18}$5%, all by weight)-Dimethyl Benzyl Ammonium Chlorides | –0.0625 |
| N-Alkyl ($C_{12}$50%; $C_{14}$30%; $C_{16}$17%; $C_{18}$3%, all by weight)-Dimethyl Ethylbenzyl Ammonium Chlorides | –0.0625 |
| Pine oil | –0.500 |
| Isopropyl Alcohol, 99% by weight | –5.000 |
| Inert Ingredients | Wt. % |
| Butyl Cellosolve | –5.000 |
| Ethoxylated Tridecyl Alcohol | –3.000 |
| Bis (2-Hydroxethyl) Cocoamine Oxide | –0.500 |
| Ammonium Hydroxide (28% solution by weight) | –1.000 |
| Perfume | –0.100 |
| Water | –79.775 |
| A–46 Propellant Gas (Phillips) | –5.000 |

TABLE I sets forth the result of stability tests which were conducted using the three formulations of EXAMPLES 1, 5 and 6, as follows:

TABLE I

Stability Tests

| | |
|---|---|
| Storage Period: | Two (2) Months |
| Storage Condition: | 130°F and 100°F |
| Propellant System: | 5% by weight A-46 |
| Can Variable: | 0.25 lb. P/T F/A; 1.2 solder; unlined tinplated can. |
| Observation: | Formulas of Examples 5 and 6 caused corrosion in container. Formula of Example 1 can and product condition were normal. |

| Product | Results |
|---|---|
| Example 1 | Can condition normal, no corrosive attack at 100°F; very slight degree of vapor phase attack at 130°F; product condition normal. |
| Example 5 | Severe detinning in liquid phase areas (130°F only); Moderate detinning at 100°F; product condition slightly altered. |
| Example 6 | Can condition same as that of Example 5; severe attack at 130°F, moderate at 100°F; product condition changed, pH off, odor off, color off. |

TABLE II sets forth the result of comparative tests using the formulations of EXAMPLES 1, 5 and 6 insofar as their aerosol germicidal properties were concerned:

TABLE II

Aerosol Germicidal Testing*

| | Ex. 1 | Ex. 5 | Ex. 6 |
|---|---|---|---|
| Salmonella choleraesuis | 0 | 0 | 0 |
| Staphylococcus aureus | 0 | + | 0 |
| Streptococcus pyogenes | 0 | 0 | 0 |
| Trichophyton interdigitale | 0 | (Not run) | 0 |
| + = denotes growth | | | |
| 0 = denotes no growth | | | |

*As described in the A.O.A.C., 10th Ed., 1965, p. 89 "Germicidal Spray Products." The spray was applied to the test surfaces by holding the container 8 inches away and spraying for 5 seconds. Letheen broth subculture medium was used with Staphylococcus aureus and Salmonella choleraesuis and Sabouraud letheen broth with Trichophyton interdigitale. Trypticase Soy Broth with 10% serum was used with Streptococcus pyogenes (beta hemolytic-Type A).

TABLE III compares the formulations of EXAMPLES 1, 5 and 6 insofar as deodorant properties are concerned:

TABLE III

Deodorant Properties

| Example 1 | Example 5 | Example 6 |
|---|---|---|
| Satisfactory | Marginal | Marginal |

TABLE IV compares the formulations of EXAMPLES 1, 5 and 6 insofar as soil removal efficiency is concerned:

TABLE IV

Soil Removal Efficiency

| Example 1 | Example 5 | Example 6 |
|---|---|---|
| Excellent | Good-Excellent | Fair |

As will be seen from the above, the formulations of the present invention provide significantly superior results over the comparative test formulations.

In the preceding portions of this specification, a novel formulation containing five essential ingredients has been described and its significant advantages for use as a composite cleanser-disinfectant aerosol have been pointed out. While the present invention is thus primarily oriented toward an aerosol formulation including both a cleanser disinfectant, however, it is intended in the present case to also cover the composite cleanser-disinfectant composition per se. In addition, the broad inventive concept previously noted includes within it several sub-concepts. One of these is the concept of rendering pine oil and ammonia compatible with one another through the use of a specific type of ethoxylated alcohol coupling agent. Since such a formulation would have use out of the cleanser-disinfectant composite as an effective cleansing agent, it is intended in the present application to cover such a sub-system including pine oil, ammonia and the ethoxylated alcohol whether in or out of an aerosol system. Similarly, a sub-invention within the broad inventive concept involves the combination of the halogenated salicylanilide and the quaternary morpholinium alkyl sulphate cationic surfactant. Again, while particular advantages flow from the use of this sub-formulation in an aerosol system, it is also intended to cover the composition per se whether in or out of an aerosol system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A composition of matter consisting essentially of pine oil, ammonium hydroxide, a sufficient quantity of an ethoxylated alcohol to cause said pine oil and said ammonium hydroxide to be rendered compatable, a halogenated salicylanilide, and a cationic surfactant, said ethoxylated alcohol being selected from compounds having a hydroxyl number of about 105–140 and having the formula $R-O-(CH_2CH_2O)_nCH_2CH_2OH$ and $R'C_6H_4(CH_2CH_2O)_xOH$ wherein R is an alkyl radical of 9–17 carbon atoms, R' is an alkyl radical of eight to nine carbon atoms, n is 5–9 and X is 7–9, and said halogenated salicylanilide being selected from the compounds of the formulas:

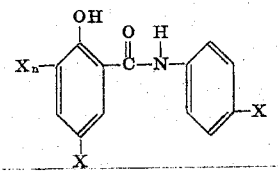

where X is chlorine, bromine or iodine and n is 0–1, and

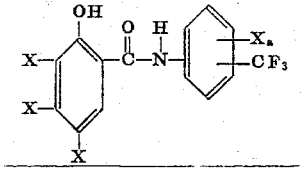

where X is chlorine, bromine, iodine or hydrogen and a is 0–2, said last mentioned compound containing 1–3 halogen atoms none of which is positioned adjacent to the $CF_3$ group or to each other; said cationic surfactant being N-alkyl-N-ethyl morpholinium ethosulfate in which the alkyl moiety contains about 14–18 carbon atoms with at least about 70 percent by weight of such alkyl moiety being composed of $C_{16} - C_{18}$ alkyl groups.

2. A composition as defined in claim 1 wherein said cationic surfactant is selected from N-soya-N-ethyl morpholinium ethosulfate or N-cetyl-N-ethyl morpholinium ethosulfate.

3. A composition of matter as defined in claim 2 wherein said halogenated salicylanilide is comprised of a synergistic mixture of 3, 5, 4'-tribromosalicylanilide and 5, 4'-dibromosalicylanilide and a stabilizer for said synergistic mixture comprised of 3,5-dibromo-3'-trifluoromethylsalicylanilide.

4. A composition of matter as defined in claim 2 wherein said composition contains approximately 0.02-0.25% by weight of said halogenated salicylanilide and about 0.008-0.10% by weight of said surfactant.

5. A pressurized container having a valve and containing the composition defined in claim 2, said container also containing a propellant to force said composition out of said container upon the opening of said valve.

6. A composition of matter consisting essentially of a halogenated salicylanilide and a cationic surfactant, said halogenated salicylanilide being selected from compounds of the formulas:

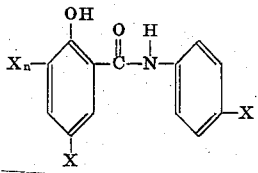

where $X$ is chlorine, bromine or iodine and $n$ is 0-1, and

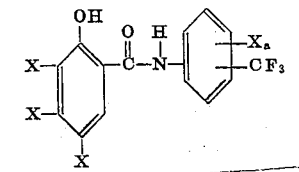

where X is chlorine, bromine, iodine or hydrogen and $a$ is 0-2, said last mentioned compound containing 1-3 halogen atoms none of which is positioned adjacent to the $CF_3$ group or to each other; said cationic surfactant being N-alkyl-N-ethyl morpholinium ethosulfate in which the alkyl moiety contains about 14-18 carbon atoms with at least about 70 percent by weight of such alkyl moiety being composed of $C_{16}$—$C_{18}$ alkyl groups.

7. A composition of matter as defined in claim 6 wherein said cationic surfactant is selected from N-soya-N-ethyl morpholinium ethosulfate or N-cetyl-N-ethyl morpholinium ethosulfate.

8. A composition of matter as defined in claim 7 wherein said halogenated salicylanilide is comprised of a synergistic mixture of 3, 5, 4'-tribromosalicylanilide and 5, 4'-dibromosalicylanilide and a stabilizer for said synergistic mixture comprised of 3, 5-dibromo-3'-trifluoromethylsalicylanilide.

9. A pressurized container having a valve and containing the composition defined in claim 7, said container also containing a propellant to force said composition out of said container upon the opening of said valve.

10. A composition of matter consisting essentially of approximately 0.1-2 percent by weight of pine oil; approximately 0.05-1 percent by weight of ammonium hydroxide (based on $NH_3$ content); approximately 0.5-5 percent by weight of an ethoxylated alcohol selected from compounds having a hydroxyl number of about 105-140 and having the formula $R-O-(CH_2CH_2O)_nCH_2CH_2OH$ and $R'C_6H_4(CH_2CH_2O)_xOH$ wherein R is an alkyl radical of nine to 17 carbon atoms, R' is an alkyl radical of eight to nine carbon atoms, $n$ is 5-9 and $x$ is 7-9; approximately 0.02-0.25 percent by weight of a halogenated salicylanilide selected from compounds of the formulas:

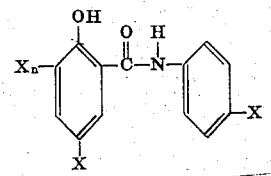

where X is chlorine, bromine or iodine and n is 0-1, and

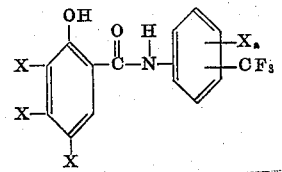

where X is chlorine, bromine, iodine or hydrogen and $a$ is 0-2, said last mentioned compound containing 1-3 halogen atoms none of which is positioned adjacent to the $CF_3$ group or to each other; and approximately 0.008-0.10 percent by weight of a cationic surfactant of the formula N-alkyl-N-ethyl morpholinium ethosulfate in which the alkyl moiety contains about 14-18 carbon atoms with at least about 70 percent by weight of such alkyl moiety being composed of $C_{16}$—$C_{18}$ alkyl groups.

11. A composition of matter as defined in claim 10 wherein said cationic surfactant is selected from N-cetyl-N-ethyl morpholinium ethosulfate and N-soya-N-ethyl morpholinium ethosulfate and said ethoxylated alcohol has the formula $R-O-(CH_2CH_2O)_6CH_2CH_2OH$ where R is tridecyl.

12. A pressurized container having a valve and containing the composition defined in claim 10, said container also containing a propellant to force said composition out of container upon the opening of said valve.

* * * * *